United States Patent [19]

Buslepp et al.

[11] Patent Number: 5,080,064

[45] Date of Patent: Jan. 14, 1992

[54] ADAPTIVE LEARNING CONTROL FOR ENGINE INTAKE AIR FLOW

[75] Inventors: Kenneth J. Buslepp, Shelby; Douglas E. Trombley, Grosse Pointe; Mark G. Kosowski, Rochester Hills, all of Mich.

[73] Assignee: General Motors Corporation, Detroit, Mich.

[21] Appl. No.: 693,105

[22] Filed: Apr. 29, 1991

[51] Int. Cl.$^5$ ................................................ F02D 7/00
[52] U.S. Cl. ..................................... 123/399; 123/489
[58] Field of Search ............... 123/399, 486, 440, 480, 123/489, 429; 60/274; 364/431.05

[56] References Cited

U.S. PATENT DOCUMENTS

| | | | |
|---|---|---|---|
| 4,733,357 | 3/1988 | Abe . | |
| 4,831,838 | 5/1989 | Nagai et al. | 60/274 |
| 4,870,938 | 10/1989 | Nakinawa | 123/489 |
| 4,881,505 | 11/1989 | Tomisawa | 123/480 |
| 4,884,547 | 12/1989 | Tamura | 123/489 |
| 4,911,129 | 3/1990 | Tomisawa | 123/469 |
| 4,913,122 | 4/1990 | Uchida et al. . | |
| 4,977,881 | 12/1990 | Abe et al. | 123/489 |
| 4,984,540 | 1/1991 | Morikawa | 123/489 |
| 4,999,781 | 3/1991 | Holl et al. | 364/431.05 |
| 5,007,398 | 4/1991 | Kashiwabara | 123/479 |
| 5,007,399 | 4/1991 | Nakinawa | 123/489 |

Primary Examiner—Raymond A. Nelli
Attorney, Agent, or Firm—Jimmy L. Funke

[57] ABSTRACT

An adaptive learning control method is described for regulating the quantity of air inducted into a fuel injected internal combustion engine to achieve a desired air-fuel ratio, where the amount of fuel supplied to each engine cylinder is determined directly as a function of operator demand for engine output. The rotational speed of the engine is sensed, and indication are derived for the actual mass of air inducted into each engine cylinder and for a desired mass of air for each engine cylinder. For the region in which the engine is operating, open-loop and closed-loop values are determined for controlling engine air flow. A previously stored learning correction value corresponding to the engine operating region is obtained, and the quantity of air flowing to the engine is adjusted in accordance with the sum of the open-loop value, the closed-loop value, and the learning correction value. The learning correction value is periodically updated as a function of the difference between the indicated actual and desired mass of air for each engine cylinder, when the engine continuously operates in the region and a predetermined time has elapsed since the engine first began continuous operation in the region.

12 Claims, 5 Drawing Sheets

ADAPTIVE LEARNING CONTROL FOR ENGINE INTAKE AIR FLOW

BACKGROUND OF THE INVENTION

This invention relates to a method for controlling the quantity of air flowing into an internal combustion engine, and more particularly, to an adaptive learning control method for regulating engine intake air flow to achieve a scheduled air-fuel ratio.

Recently, fuel based control systems have been applied to fuel injected internal combustion engines to regulate the combustion air-fuel ratio. In such systems, the amount of fuel supplied to each cylinder during an engine cycle is determined directly as a function of the operator demand for engine output, such as indicated by the degree of depression of an accelerator pedal. In response to the amount of injected fuel, the engine intake air flow is then controlled with a closed-loop feedback system to effectuate engine operation at a scheduled air-fuel ratio. Traditionally, a proportional-integral (PI) feedback control scheme has been used to adjust the position the engine intake air throttle valve based upon the difference between the actual mass of air inducted into each engine cylinder and a desired mass of air corresponding to the schedule air-fuel ratio.

This form of closed-loop air control provides relatively accurate air-fuel regulation under constant or slowly varying engine operating conditions. However, when the engine operating conditions change rapidly, the accuracy of the air flow control is limited by air and/or fuel transport time delays inherent in the engine. As a consequence, the conventional closed-loop control system is not capable of accurately tracking and correcting engine air flow during these abrupt transitions. As a result, the actual engine air-fuel ratio can deviate significantly from the scheduled air-fuel ratio, thereby increasing the level of undesirable exhaust emission produced by the engine.

SUMMARY OF THE INVENTION

In view of the above-mentioned disadvantage associated with conventional fuel based engine control systems, it is an object of the present invention to provide a control method for regulating engine intake air flow, by adaptively learning a correction related to the desired quantity of engine intake air for each of several defined regions of engine operation. For the particular region in which the engine is operating, the present method then incorporates the corresponding learning correction into the feedback control of engine air flow, thereby affording faster response and higher accuracy in the regulation of the engine air-fuel ratio, during transient engine operation.

According to the present invention, an indication of the actual mass of air inducted into each engine cylinder is derived, along with an indication for a desired mass of air for each cylinder, where the desired mass of air per cylinder corresponds to a scheduled air-fuel ratio. The particular region in which is engine is operating is determined based upon the engine operating parameters. A value is then obtained for a previously stored learning correction, which is associated with the determined region of engine operation. This value of the learning correction is used when adjusting the quantity of intake air flowing into the engine to reduce the difference between the indicated actual and desired mass of air per cylinder. The value of the stored learning correction is then updated as a function of the difference between the indicated actual and desired mass of air per cylinder. Consequently, the present invention provides a method for adjusting engine intake air to a desired quantity, and then learning a correction based upon the adjustment, so that the correct air flow can be achieved more rapidly, when the engine subsequently operates in the region.

More particularly, a closed-loop value for the feedback control of engine air flow is determined based upon the difference between the indicated actual and desired mass of air per engine cylinder. An open-loop value for more rapid feedforward control of air flow control is determined based upon the rotational speed of the engine and the indicated desired mass of air per cylinder. The quantity of intake air flowing into the engine is then controlled as a function of the sum of the open-loop value, the closed-loop value, and the learning correction value. Preferably, the open-loop value represents the base position of the engine intake throttle valve, which statistically produces the desired mass of air per cylinder at a defined altitude, such as sea level. Due to variances between engines, component aging, or operation at different altitudes, the open-loop value only approximates the throttle position corresponding to the desired quantity of intake air per cylinder. The present invention, however, adapts to these different operational and environmental conditions by updating the learning correction values associated with the different regions of engine operation. As a result, the open-loop value in combination with the properly updated learning correction value represents the desired position of the throttle for the corresponding region of engine operation. Accordingly, the present invention provides a method for adaptive learning corrections to account for engine to engine variations, engine component aging, and/or changing environmental conditions such altitude.

According to one aspect of the invention, the value of the stored learning correction is periodically updated, when the engine continuously operates in the same region and a predetermined time has elapsed since the engine first began to operate in this region. This prevents updating of the learning correction during operating transitions that move the engine into different operational regions, and delays the updating until the engine is essentially in steady state operation in an operating region. Additionally, the period between updating in an operating region can be appropriately selected to give the engine sufficient time to respond to intake air flow adjustments, before the learning correction is updated to a new value.

According to another aspect of the invention, the value of the stored learning correction for a region of engine operation is updated based upon the integral or running summation of the difference between the indicated actual and desired mass of air for each engine cylinder. This averaging of the variations between the indicated actual and desired air mass per cylinder provides a degree of filtering, which eliminates noise from the learning process.

According to yet another aspect of the invention, the indicated desired mass of air per cylinder correspond to the air-fuel ratio scheduled for the engine. During normal engine operation, the scheduled engine air-fuel ratio may be constant, for example, at the stoichiometric value. In this case, the desired mass of air for each engine cylinder is derived as a function of the amount of fuel supplied to each cylinder. For other applications, such as two-stroke engines or lean burn four-stroke engines, the scheduled air-fuel ratio is not constant, and will vary with engine operating parameters, such as engine rotational speed. The present invention can also be utilized in these applications, since it provides for the determination of the indicated desired mass of air per cylinder as a function of engine operating parameters, such as engine speed, as well as the amount of fuel supplied to each cylinder. Thus, the present invention is applicable to engines having both constant and variable air-fuel ratio schedules.

According to still another aspect of the invention, a conventional mass air flow sensor can be employed to measure and derive the indication for the actual mass of air flowing into an engine cylinder. Alternatively, a conventional wide-range air-fuel ratio sensor may be disposed within engine exhaust system to measure the actual operating combustion air-fuel ratio. The indication of the actual air mass per cylinder can then be derived based upon the measured air-fuel ratio and the amount of fuel supplied to each cylinder. Thus, the present invention provides a method for accurately regulating the air-fuel ratio of an engine that is equipped with either a mass air flow sensor or a wide-range air-fuel ratio sensor.

These and other aspects and advantages of the invention may be best understood by reference to the following detailed description of the preferred embodiments, when considered in conjunction with the accompanying drawings.

DESCRIPTION OF THE PREFERRED EMBODIMENTS

Figure 1:
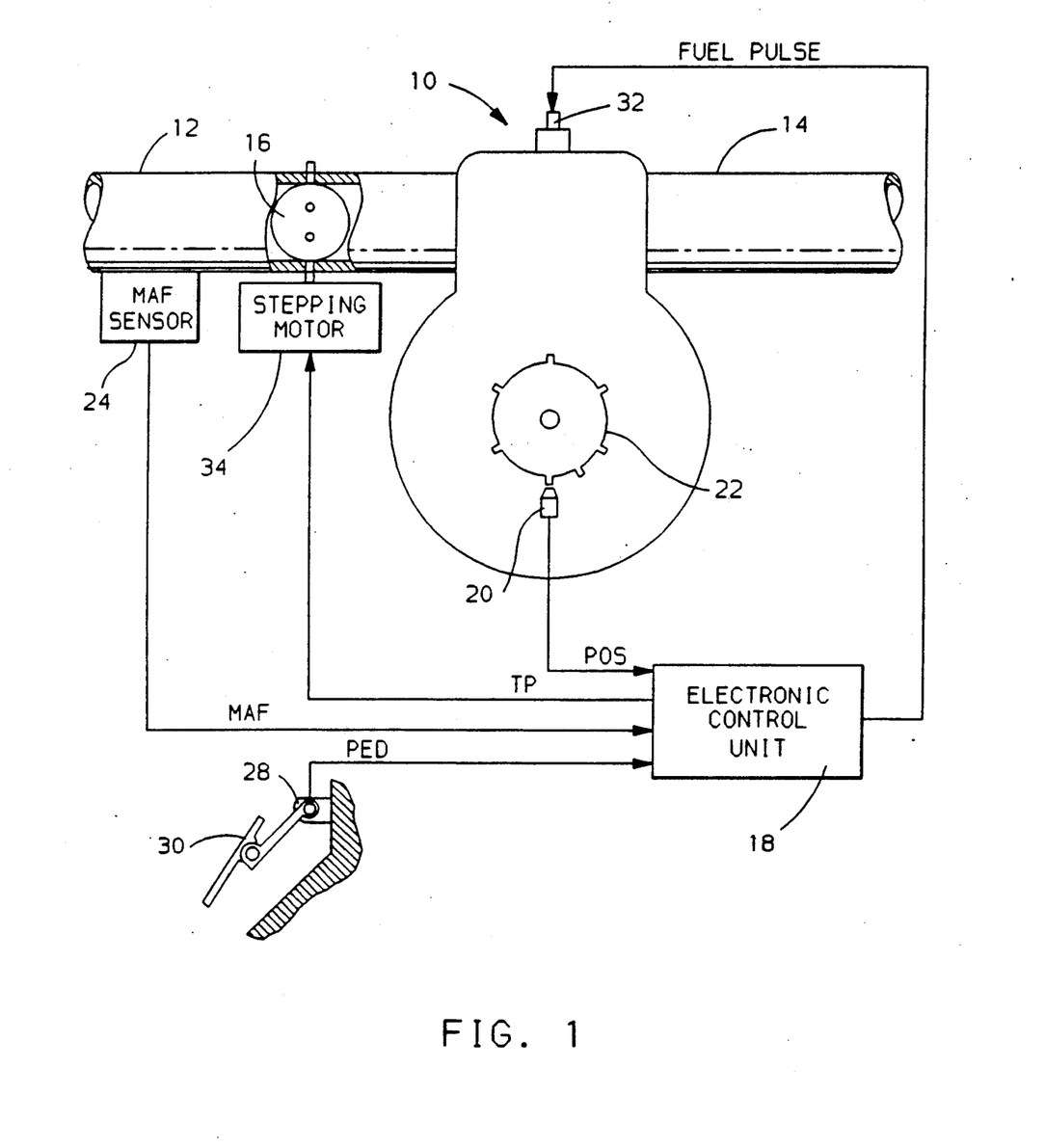
FIG. 1 schematically illustrates a fuel injected internal combustion engine and a control system for regulating the quantity of air inducted by the engine in accordance with the principles of the present invention. The control system includes a mass air flow sensor for deriving an indication of the actual mass of air inducted into each engine cylinder.

Referring to FIG. 1, there is shown schematically a fuel injected, internal combustion engine, generally designated as 10, with an associated intake system 12 for supplying air to the engine 10 and an exhaust system 14 for transporting combustion products away from the engine 10. A throttle valve 16 is disposed within the air intake system 12 for the purpose of regulating the quantity of air flowing into the engine 10.

The operation of engine 10 is controlled by a conventional electronic control unit (ECU) 18, which receives input signals from several standard engine sensors, processes information derived from these input signals in accordance with a stored program, and then generates the appropriate output signals to control various engine actuators. To simplify the discussion, only the engine sensors and actuators associated with the present invention have been illustrated in FIG. 1.

The ECU 18 includes a central processing unit, random access memory,-read only memory, non-volatile memory, analog-to-digital and digital-to-analog converters, input/output circuitry, and clock circuitry, as will be recognized by those skilled in the art of modern computer engine control.

The ECU 18 is supplied with a POS input signal that indicates the rotational position of engine 10. The POS input can be derived from a standard electromagnetic sensor 20, which produces pulses in response to the passage of teeth on wheel 22, as it is rotated by engine 10. As shown, wheel 22 can include a non-symmetrically spaced tooth, to provide a reference pulse for determining the specific rotational position of the engine 10 in its operating cycle. Also, by counting the number of symmetrical pulses in the POS signal that occur in a specified time period, the ECU determines the rotational speed of engine 10 in revolutions per minute (RPM).

The quantity or mass of air flowing into engine 10 may be obtained by placing a conventional mass air flow (MAF) sensor 24 in the air intake system 12 to provide ECU 18 with a MAF input signal. Alternatively, the mass of air flowing into engine 10 can be determined by sensing the pressure within the air intake system 12 and the degree of opening of the throttle value 16, as is well known in the art. Any other means known in the art could also to used to provide ECU 18 with the information necessary to determine engine mass air flow.

Additionally, a standard potentiometer 28 is coupled to an accelerator pedal 30 to provide ECU 18 with a PED input signal. This PED input signal indicates the degree to which the accelerator pedal 30 is depressed in response to operator demand for engine output power.

During normal operation, the ECU 18 looks up a value for the quantity of fuel to be supplied to each engine cylinder from a table, which is permanently stored in the read only memory as a function of the depression of the accelerator pedal 30. Typically, the value obtained from the look-up table represents the width of a FUEL PULSE that is applied to activate the electrical solenoid of an engine fuel injector 32. The duration of the FUEL PULSE determines the on-time of the fuel injector 32, and the resulting metered quantity of fuel per cylinder (FPC) injected into the engine 10. At the appropriate rotational positions of engine 10, the ECU 18 functions in this fashion to generate the appropriate fuel pulses for each engine cylinder (only one of which is shown in FIG. 1). This is commonly referred to as a fuel based system, since the depression of the accelerator pedal directly determines the quantity of injected fuel, as opposed to an air based system, where the accelerator pedal directly control engine air flow.

In the typical fuel based system, the engine air flow is controlled in a closed-loop fashion to achieve a desired air flow corresponding to a scheduled combustion air-fuel ratio. The scheduled air-fuel ratio is generally chosen to reduce exhaust emissions and/or increase fuel economy. The scheduled air-fuel ratio may be fixed at the constant stoichiometric value, or it may vary with one or more engine operating parameters, as for example, engine rotational speed in two-stroke and lean burn four-stroke engine applications.

Traditionally, a proportional-integral (PI) feedback control scheme has been employed to regulate the position the engine air throttle valve 16 to achieve a desired engine air flow. The ECU 18 computes a value for the desired air mass per cylinder by multiplying the scheduled air-fuel ratio by the injected quantity of fuel per cylinder (FPC). The actual mass of air supplied to each cylinder is then obtained by averaging the MAF input signal over an engine cycle and dividing by the number of engine cylinder. Using PI feedback control, the ECU 18 generates a throttle position output signal TP, based upon the difference between the values for the actual and desired air mass per cylinder. The TP output signal is then applied to drive a stepping motor 34, which is mechanically coupled to air throttle valve 16, and appropriately adjusts the quantity of air flowing into engine 10.

This form of closed-loop feedback control of engine air flow provides relatively accurate air-fuel regulation under constant or slowly varying engine operating conditions. However, when engine operating conditions change rapidly, the accuracy of the air flow control is limited by air and/or fuel transport time delays inherent in the engine. As a consequence, the conventional control system is not capable of accurately tracking and correcting engine air flow during these abrupt transitions. As a result, the actual engine air-fuel ratio can deviate significantly from the scheduled air-fuel ratio, thereby increasing the level of undesirable exhaust emission produced by the engine.

In view of this disadvantage associated with conventional fuel based engine control systems, the present invention is direct toward providing a control method for regulating engine intake air flow, which is capable of adaptively learning a correction related to the desired quantity of engine intake air for different regions of engine operation For the particular region in which the engine is operating, the present method then incorporates the corresponding learning correction into the feedback control of engine air flow, thereby affording faster response and higher accuracy in the regulation of the engine air-fuel ratio, during transient engine operation.

According to the present invention, an indication of the actual mass of air inducted into each engine cylinder is derived, along with an indication for a desired mass of air for each cylinder, which corresponds to the scheduled air-fuel ratio. The particular region in which is engine is operating is determined based upon the engine operating parameters. A value is then obtained for a previously stored learning correction, which corresponds to the region of engine operation. This learning correction value is used when adjusting the quantity of intake air flowing into the engine to reduce the difference between the indicated actual and desired mass of air for each engine cylinder. The value for the stored learning correction is then updated as a function of the difference between the indications for the actual and desired mass of air for each cylinder Consequently, the present invention provides a method for adjusting engine intake air to a desired quantity, and then learning a correction based upon the adjustment, so that the correct air flow can be achieved more rapidly, for subsequent engine operation in the region.

Figure 2:
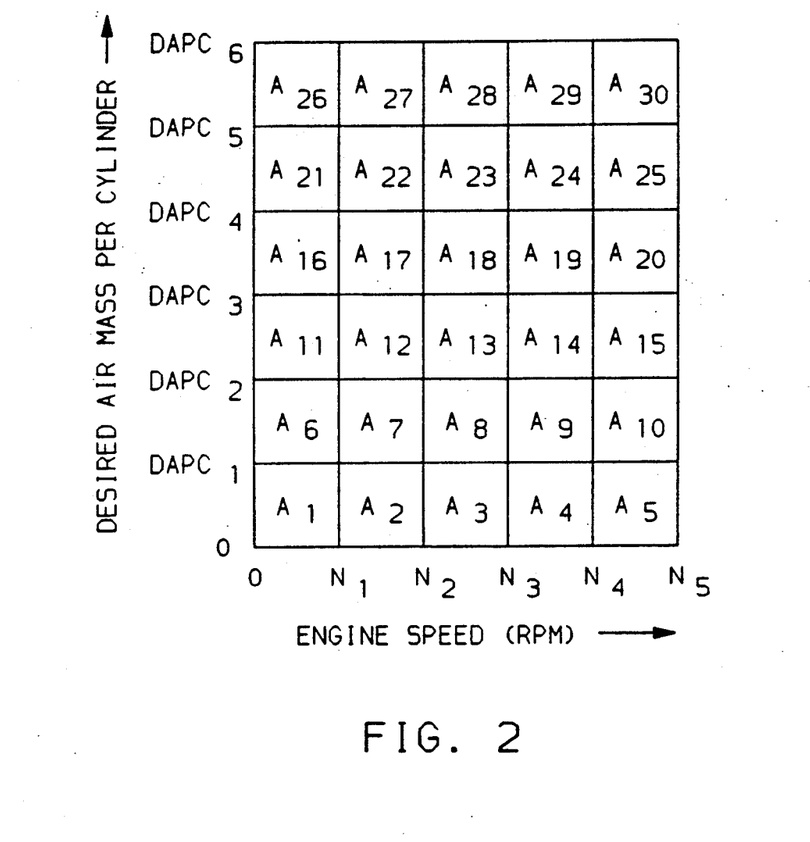
FIG. 2 schematically illustrates a map containing the memory address locations of learning corrections corresponding to different defined regions of engine operation.

Referring now to FIG. 2, there is shown schematically a map established in the ECU 18 to represent a plurality of engine operating regions. For the present embodiment, the engine operating parameters used to define these different operating regions are five ranges of engine rotational speed ($0-N_1$, $N_1-N_2$, $N_2-N_3$, $N_3-N_4$, and $N_4-N_5$) and six ranges of desired air mass per cylinder ($0-DAPC_1$, $DAPC_1-DAPC_2$, $DAPC_2-DAPC_3$, $DAPC_3-DAPC_4$, $DAPC_4-DAPC_5$, and $DAPC_5-DAPC_6$). These ranges divide normal engine operation into essentially thirty regions, with each region having a corresponding address denoted as one of $A_1-A_{30}$. Each address points to the storage location in non-volatile memory for the value of the learning correction corresponding to the particular engine operating region.

For a particular speed N and desired air mass per cylinder DAPC, the ECU 18 determines the region of normal engine operation from the map illustrated in FIG. 2. For example, when the engine speed and desired air mass per cylinder are such that $N_2 \leq N < N_3$ and $DAPC_4 \leq DAPC < DAPC_5$, the the engine will be operating in the region having the learning correction address $A_{23}$. In practice, it has been found desirable to introduce a small degree of hysteresis when determining the operating region, to avoid undesirable oscillations back and forth between regions, when the engine speed and desired air mass per cylinder take on values near the range end points. This is accomplished by slightly decreasing the value of the lower end point for each range of engine speed and desired air mass per cylinder by offsets (for example, by $\Delta N$ or $\Delta DAPC$ respectively), when the engine rotational speed or desired air mass per cylinder is decreasing in value. For example, if the engine is operating in the region having the address $A_{23}$, the engine speed would have to decrease below $N_2-\Delta N$ and/or the desired air mass per cylinder would have to decrease below $DAPC_4-\Delta DAPC$, before the engine would change operating regions. The upper range end points without the offsets are used to determine the operating region, whenever engine speed and/or the desired air mass per cylinder are increasing in value. Thus, for operation in the region having the address $A_{23}$, an increase in engine speed to $N_3$ and/or and increase in the desired mass air per cylinder to $DAPC_5$ would be sufficient to change the engine operating region.

Figure 3A:
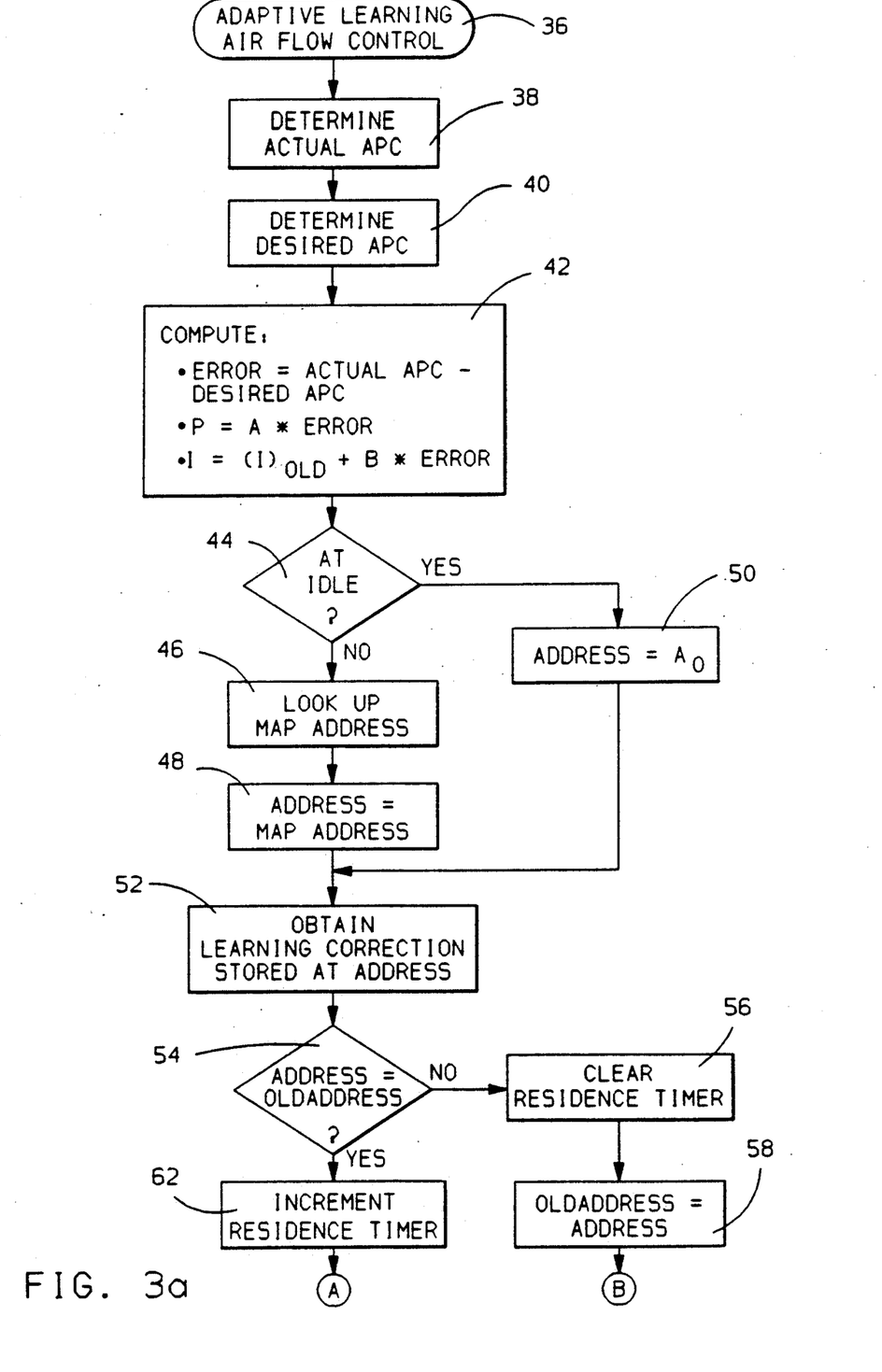
FIGS. 3a and 3b are flow diagrams representative of the steps executed by the electronic control units in FIGS. 1 and 4, when regulating the quantity of engine intake air in accordance with the principles of the present invention.
Figure 3B:
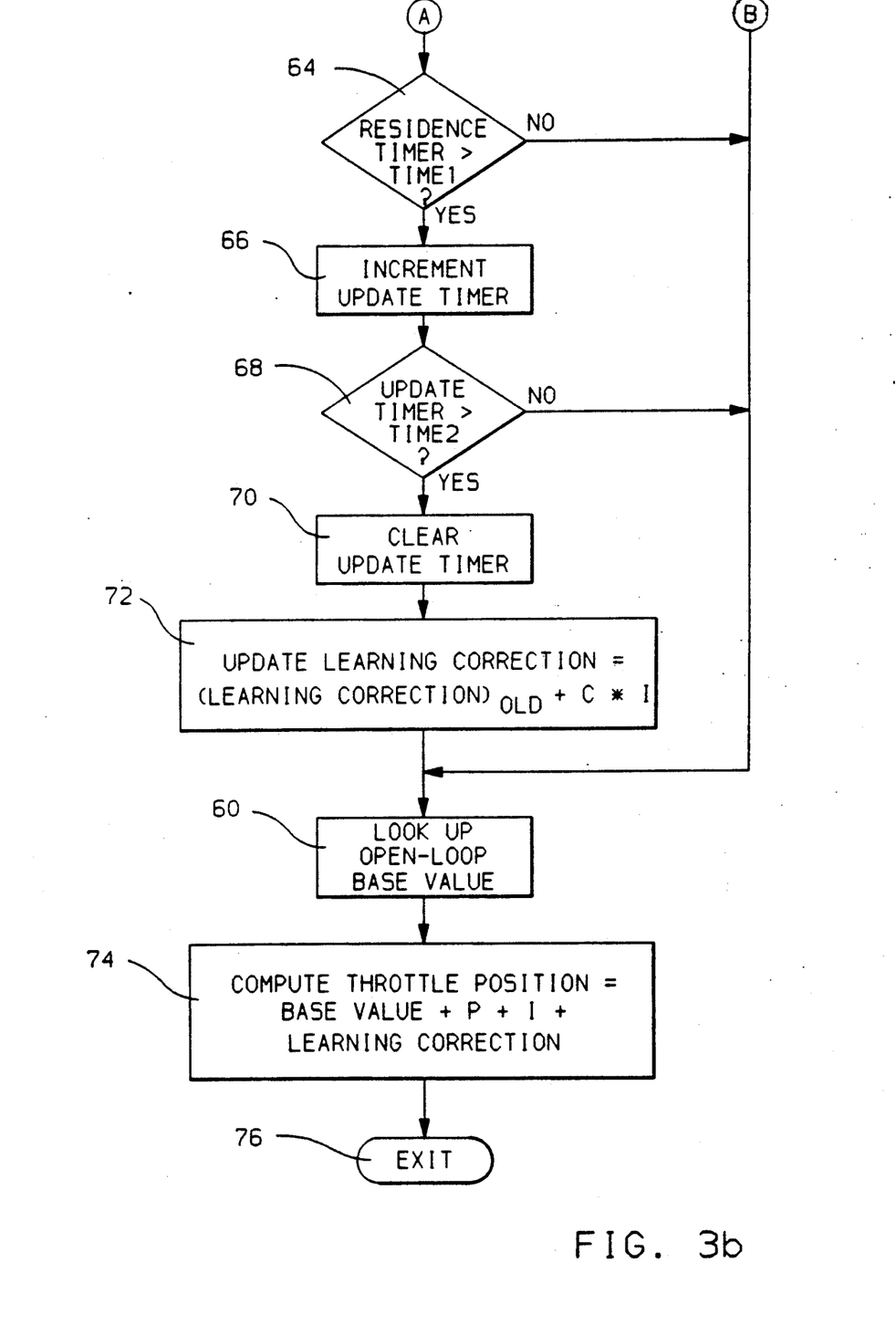

FIGS. 3a and 3b show a flow diagram representative of the steps executed by ECU 18, when regulating the air flow into engine 10 in accordance with the adaptive learning method of the present invention. All of the appropriate counter, flags, registers, and timers within the ECU 26 are initialized upon the starting of the engine 10. During normal engine operation, the ADAPTIVE LEARNING AIR FLOW CONTROL routine is executed as part of the main looped engine control program stored within ECU 18. However, the routine is bypassed whenever the engine operates in known modes such as cranking to start or deceleration fuel cut-off. During such abnormal modes of engine operation, the scheduled air-fuel ratio is not maintained, and therefore, it would not be desirable to learn the associated air flow corrections.

Once entered, the routine proceeds directly from point 36 to step 38, where an indication for the actual mass of air inducted into each engine cylinder, or the actual air mass per cylinder (actual APC) is derived. For the embodiment illustrated in FIG. 1., this is accomplished by sampling and averaging the mass air flow input signal MAF over an engine cycle, and then dividing this averaged mass air flow (in grams per second) by a quantity computed by multiplying the engine speed (revolutions per second) by the number of cylinders supplied with air during an engine revolution (the total number of cylinders in a two-stroke engine, or one-half the cylinders of a four-stroke engine).

Next, the routine proceeds to step 40 to derive an indication for the desired mass of air per engine cylinder (desired APC), which corresponds to the scheduled air-fuel ratio for the engine. As stated previously, the scheduled combustion air-fuel ratio is typically chosen to reduce exhaust emissions and/or increase fuel economy. Depending upon the particular application, this scheduled air-fuel ratio may be fixed at the constant stoichiometric value, or it may vary with one or more engine operating parameters, such as engine rotational speed in two-stroke and lean burn four-stroke engine applications. If the scheduled air-fuel ratio is constant at the stoichiometric value, the indication for the desired APC can be derived by multiplying the constant air-fuel ratio by the metered amount of fuel injected into each cylinder (FPC), corresponding to the width of the FUEL PULSE. If the scheduled air-fuel ratio varies as a function of a parameter such as engine rotational speed, then the desired APC will also vary as a function of engine speed. In this type of application, values for the desired APC, which correspond to the scheduled air-fuel ratio, are determined experimentally as a function of engine speed and the amount of fuel supplied to each cylinder (FPC), using standard calibration measurements on an engine dynamometer. Representative desired APC values are then stored in a look-up table. The indication for the desired APC can then be retrieved from the table as a function of the current amount of fuel being supplied per cylinder (FPC) and the rotational speed as derived from the POS input signal to the ECU 18. Thus, the present invention is applicable to engines having either constant or variable air-fuel ratio schedules.

The routine then proceeds to step 42, where values for conventional proportional-integral (PI) feedback control terms are computed. First, a value for an ERROR term is found by subtracting the desired APC found at step 40, from the actual APC found at step 38. This feedback ERROR term is then used to compute values for a proportional feedback control term P and an integral feedback control term I. The proportional term P is equal to the ERROR term multiplied by a predetermined constant A. The integral term I assigned the previously computed value for I, designated as (I)$_{OLD}$, plus the ERROR term multiplied by a predetermined constant B. As is well known in the control art, computing I as a running summation of the ERROR term in essence integrates the ERROR term to provide a degree of filtering, which eliminates noise from integral feedback I term.

Next at step 44, a decision is required as to whether engine parameters indicated that the engine is operating in a region known as the idling condition. During normal engine operation, the idling condition is detected by the lack of depression of the accelerator pedal 30 by the operator. If the PED input to the ECU indicates that the pedal 30 is not depressed then the routine proceeds to 50. If PED input indicates that the pedal 30 is depressed, then the engine is determined not to be operating in the idling region and the routine proceeds to step 46.

When the engine is not operating at idle, the routine proceeds to step 46, where a map address is looked up from the engine region map schematically illustrated in FIG. 2. As described previously, the ECU obtains the appropriate map address for the learning corrections associated with the current engine operating region, based upon the engine rotational speed derived from the POS input signal and the desired air mass per engine cylinder determined at step 40. The routine then passes to step 48, where a variable designated as ADDRESS is set to the value of the map address looked up at step 46. After completing step 48, the routine passes to step 52.

Returning again to the decision step 44, if the engine is operating in the idle region, the routine proceeds to step 50. At step 50, the variable ADDRESS is set to an address A$_0$, which represents a storage location in non-volatile memory, which containing a value for the single learning corrections established to represent the idling region of engine operation. After the completion of step 50, the routine proceeds to step 52.

At step 52, the value for the appropriate learning correction is obtained from the location in non-volatile memory pointed to by the value of ADDRESS. This learning correction value is assigned to a variable designated as LEARNING CORRECTION.

Next at step 54, a decision is required as to whether the variable ADDRESS is equal to OLDADDRESS, which represents the previous value of ADDRESS during the most recent pass through the present routine. If ADDRESS equals OLDADDRESS, then the engine is continuing operation in the same region, and the routine passes to step 62. However, if ADDRESS is not equal to OLDADDRESS, the engine operating parameters have changed sufficiently to move it into a new operating region, and the routine passes to step 56.

At step 56, a RESIDENCE TIMER is cleared, to initiate timing in the new region of engine operation, and the routine proceeds to step 58, where OLDADDRESS is set equal to the current value of ADDRESS. From step 58, the routine passes to step 60.

If it is determined at step 54 that the engine is continuing operation in the same region, then the routine proceeds to step 62, where the value of the RESIDENCE TIMER is incremented. At step 64, this RESIDENCE TIMER value is examined to determine whether the engine has continuously operated in the current region for more than a predetermined time represented by TIME1. If the RESIDENCE TIMER is not greater that TIME1, the routine passes to step 60. However, if the RESIDENCE TIMER is greater than TIME1, the routine proceeds to step 68.

When the routine moves to step 68, the value of an UPDATE TIMER is examined to determine whether it exceeds a period of time represented by TIME2. As will become evident, TIME2 represents the amount time between periodic updates of a learning correction value in non-volatile memory, when the engine continuously operates in the same region. If the value of the UPDATE TIMER is not greater than the period TIME2, the routine passes to step 60. However, if UPDATE TIMER value is greater that the period TIME2, the routine proceeds to step 70.

When the routine passes to step 70, the UPDATE TIMER is cleared to restart its timing function. Then at step 72, the LEARNING CORRECTION value at the location in non-volatile memory currently pointed to by ADDRESS is updated. The new value for the LEARNING CORRECTION is equal to its previous value, represented by (LEARNING CORRECTION)$_{OLD}$, plus the product of the integral feedback correction term I multiplied by a specified constant C. Recall that the integral feedback correction term I was computed as step 42 as the integral or running summation of the difference between the actual and desired mass of air per engine cylinder. Because the stored value of the learning correction is updated based upon the integral feedback correction term, a degree of filtering is provided to eliminate noise from the learning process. After the value of the LEARNING CORRECTION has been updated, the routine proceeds to step 60.

It will be recognized that the learning correction value will only be updated at step 72, when the engine continuously operates the same region represented by the value of ADDRESS and a predetermined period of time TIME1 has elapsed since the engine fist began to operate continuously in the region. If the engine has not operated in the same region for at least the time TIME1, then the updating at step 72 will be bypassed by the decision made at step 64. This prevents updating of a learning correction during transitions that move the engine into different operating regions, and delays the updating until the engine essentially reaches a steady state Additionally, the updating at step 72 is bypassed by the decision made at step 68, if a TIME2 has not yet elapsed since the most recent updating of the learning correction. Thus, a sufficient period of time can be established in between the periodic updating of a learning correction to give the engine sufficient time to respond to any adjustments made to engine air flow.

At step 60, an open-loop BASE VALUE for controlling engine air flow is looked up in a calibrated table as a function of the current engine rotational speed and the desired air mass per cylinder (DAPC). For the embodiment illustrated in FIG. 1, the open-loop BASE VALUE represents the base position of the engine intake throttle valve 16, which statistically produces the the desired mass of air per cylinder at a defined altitude, such as sea level. As will be understood by those skilled in the art, the data for the look-up table can be obtained by conducting engine calibration measurements on a dynamometer.

Next, the routine proceeds to step 74, where a value for a variable denoted as THROTTLE POSITION is computed by summing the open-loop BASE VALUE, the proportional feedback term P, the integral feedback correction term I, and the present value assigned to the LEARNING CORRECTION for the present region of engine operation. After the completion of step 76, the routine exits at point 76.

The open-loop BASE VALUE provides a rapid feedforward correction for the regulation of the engine intake air flow. The feedback correction terms P and I provide the conventional proportional-integral closed-loop feedback correction for the engine air flow control. The open-loop BASE VALUE will only approximate the related throttle position for the desired air flow, due to variances between engines of the same type, component aging, and/or engine operation at different altitudes. These conditions are accounted for with the present invention, because the computed THROTTLE POSITION variable includes the a value for the LEARNING CORRECTION associated with the region of engine operation. The combination of the open-loop BASE VALUE with the properly updated LEARNING CORRECTION then represents the most recently learned throttle position that produced the desired quantity of engine intake air per cylinder.

At the appropriate times (for example, once per engine cycle), the ECU generates the appropriate output signal TP, based upon the value of the THROTTLE POSITION variable computed at step 74. This TP output signal then drives the stepping motor 34, to position the throttle value 16 for the desired quantity of engine intake air.

Figure 4:
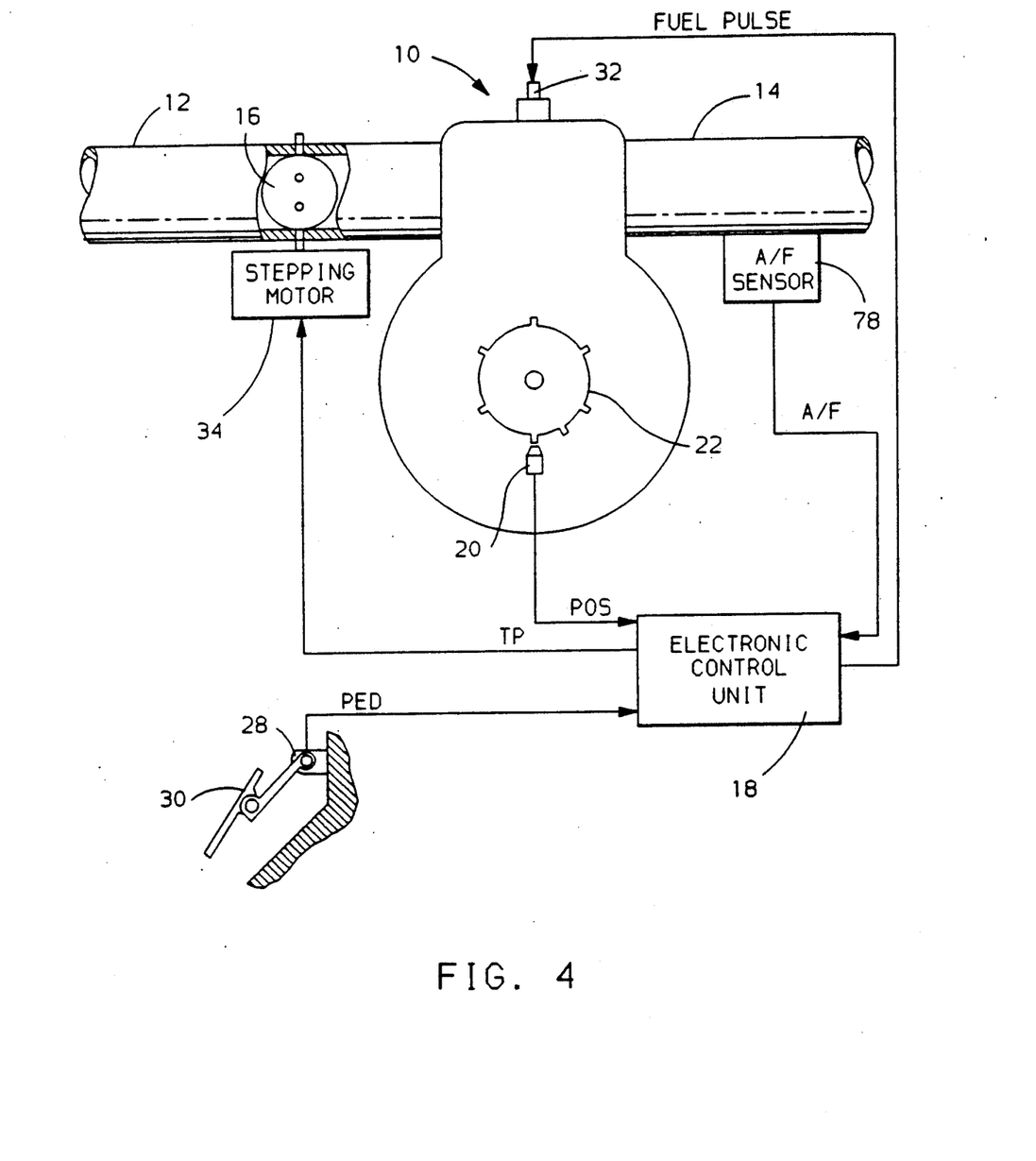
FIG. 4 schematically illustrates a fuel injected internal combustion engine and a control system for regulating the quantity of air inducted by the engine in accordance with he principles of the present invention. The control system includes an air-fuel sensor for deriving an indication of actual mass of air inducted into each engine cylinder.

An alternative embodiment for practicing the adaptive learning control method of the present method is illustrated in FIG. 4, with the same numerals denoting the identical structure present in FIG. 1. It will be recognized that system shown in FIG. 4 does not include a mass air flow sensor. Instead a wide-range air-fuel (A/F) sensor 78 is disposed in the engine exhaust system 14. This A/F sensor measures the oxygen concentration in the exhaust gas stream and provides the ECU 18 with an A/F input signal proportional to the actual operating air-fuel ratio of the engine 10. Such sensors have recently become commercially available, and are typically capable of measuring air-fuel ratios that range from approximately 15:1 to 60:1.

The previously described method of adaptive air flow control is directly applicable to the embodiment shown in FIG. 4. Referring again to flow diagram presented in FIGS. 3a and 3b, and in particular to step 40, the indication for the actual mass of air flowing into each engine cylinder (actual APC) at this step, can be now be derived quite simply based upon the A/F input signal. This is accomplished within the ECU 18 by multiplying the known amount of fuel supplied to each engine cylinder (FPC) by the measured air-fuel ratio derived from the A/F input signal. The resulting product provides a direct indication of the actual mass of air inducted into each cylinder (actual APC) as required at step 40. With the exception of step 40, the remaining steps in the flow diagram of diagram presented in FIGS. 3a and 3b are executed as previously described in the discussion related to the embodiment shown in FIG. 1.

The adaptive learning feature of the present invention compensates for any lag or time delay associated with A/F sensor by updating region learning corrections as the engine reaches stead state operation. Thus, the present invention provides a method for accurately regulating the air-fuel ratio of an engine that is equipped with either a mass air flow sensor or a wide-range air-fuel ratio sensor.

The aforementioned description of the preferred embodiments of the invention is for the purpose of illustrating the invention, and is not to be considered as limiting or restricting the invention, since many modifications may be made by the exercise of skill in the art without departing from the scope of the invention.

The embodiments of the invention in which an exclusive property or privilege is claimed are defined as follows:

1. An adaptive learning control method for regulating the quantity of intake air flowing into a fuel injected internal combustion engine to achieve a scheduled air-fuel ratio, where the amount of fuel supplied to each engine cylinder is determined directly as a function of the operator demand for engine output, with the engine having a plurality of operating regions defined by its operating parameters, the steps of the method comprising:

deriving an indication of the actual mass of air inducted into each engine cylinder;

deriving an indication of a desired mass of air for each engine cylinder, which corresponds to the scheduled air-fuel ratio;

determining the region in which the engine is operating based upon the engine operating parameters;

obtaining a value for a previously stored learning correction that corresponds to the region in which the engine is operating;

adjusting the quantity of intake air flowing into the engine as a function of at least the learning correction value, to reduce the difference between the indications for the actual and desired mass of air for each engine cylinder; and updating the value of the stored learning correction as a function of the difference between the indications for the actual and desired mass of air for each engine cylinder.

2. The method described in claim 1, wherein the stored learning coefficient is updated, when the engine continuously operates in the region and a predetermined time has elapsed since the engine first began continuous operation in the region.

3. The method described in claim 1, wherein the indication for the desired mass of air for each engine cylinder is derived as a function of at least the amount of fuel supplied to each cylinder.

4. The method described in claim 1, wherein the indication for the desired mass of air for each engine cylinder is derived as a function of at least the amount of fuel supplied to each each cylinder and the rotational speed of the engine.

5. The method described in claim 1, wherein the step of deriving the indication of the actual mass of air inducted into each engine cylinder includes sensing the mass air flow into the engine.

6. The method described in claim 1, wherein the step of deriving the indication of the actual mass of air inducted into each engine cylinder includes sensing the engine operating air-fuel ratio.

7. An adaptive learning control method for regulating the quantity of intake air flowing into a fuel injected internal combustion engine to achieve a scheduled air-fuel ratio, where the amount of fuel supplied to each engine cylinder is determined directly as a function of the operator demand for engine output, with the engine having a plurality of operating regions defined by its operating parameters, the steps of the method comprising:

sensing the rotational speed of the engine;

deriving an indication of the actual mass of air inducted into each engine cylinder;

deriving an indication of a desired mass of air for each engine cylinder, which corresponds to the scheduled air-fuel ratio;

determining the region in which the engine is operating based upon the engine operating parameters;

determining an open-loop value for controlling engine air flow based upon the rotational speed of the engine and the indication for the desired mass of air for each engine cylinder;

determining a closed-loop value for controlling engine air flow based upon the difference between the indications for the actual and desired mass of air for each engine cylinder;

obtaining a value for a previously stored learning correction that corresponds to the region in which the engine is operating;

adjusting the quantity of intake air flowing into the engine in accordance with the sum of the open-loop value, the closed-loop value, and learning correction value; and updating the value of the stored learning correction periodically, as a function of the difference between the indications of actual and desired mass of air for each engine cylinder, when the engine continuously operates in the region and a predetermined time has elapsed since the engine first began continuous operation in the region.

8. The method described in claim 7, wherein the stored learning correction is periodically updated based upon the integration of the difference between the indications for the actual and desired mass of air for each engine cylinder.

9. The method described in claim 7, wherein the indication for the desired mass of air for each engine cylinder corresponding to the scheduled air-fuel ratio is derived at least as a function of the amount of fuel supplied to each cylinder.

10. The method described in claim 7, wherein the indication for the desired mass of air for each engine cylinder is derived as a function of at least the amount of fuel supplied to each cylinder and the rotational speed of the engine.

11. The method described in claim 7, wherein the step of deriving the indication of the actual mass of air inducted into each engine cylinder includes sensing the mass air flow into the engine.

12. The method described in claim 7, wherein the step of deriving the indication of the actual mass of air inducted into each engine cylinder includes sensing the engine operating air-fuel ratio.

* * * * *